April 11, 1950 W. D. HALL 2,503,261
CONTROL SYSTEM FOR HEATERS
Filed March 20, 1947 3 Sheets-Sheet 1
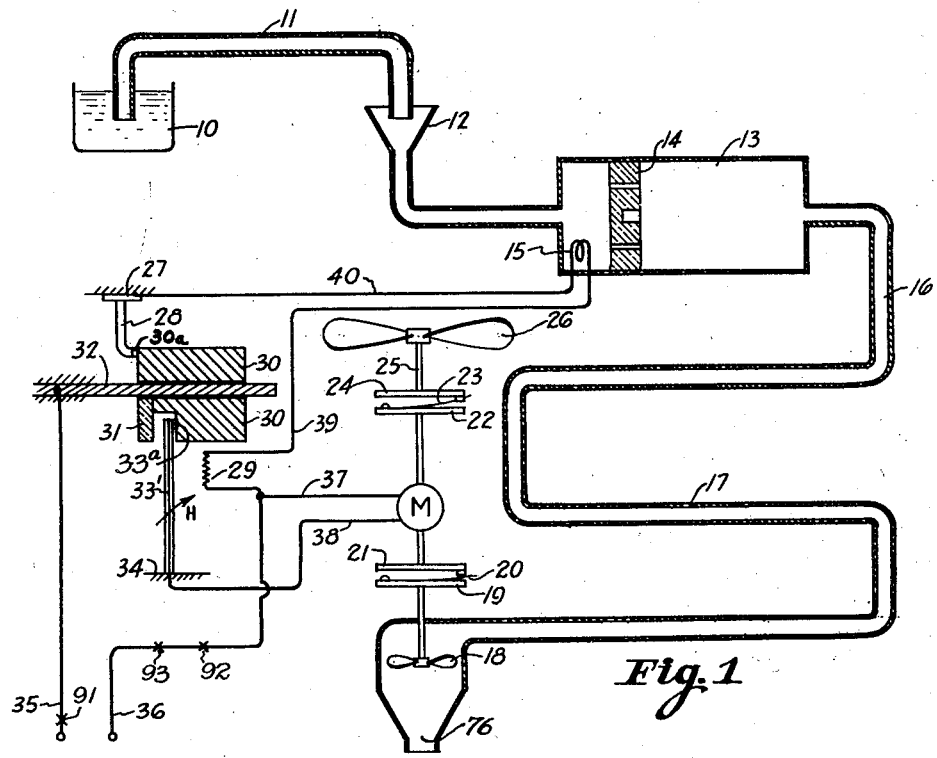
INVENTOR.
William D. Hall April 11, 1950          W. D. HALL          2,503,261
CONTROL SYSTEM FOR HEATERS
Filed March 20, 1947          3 Sheets-Sheet 2
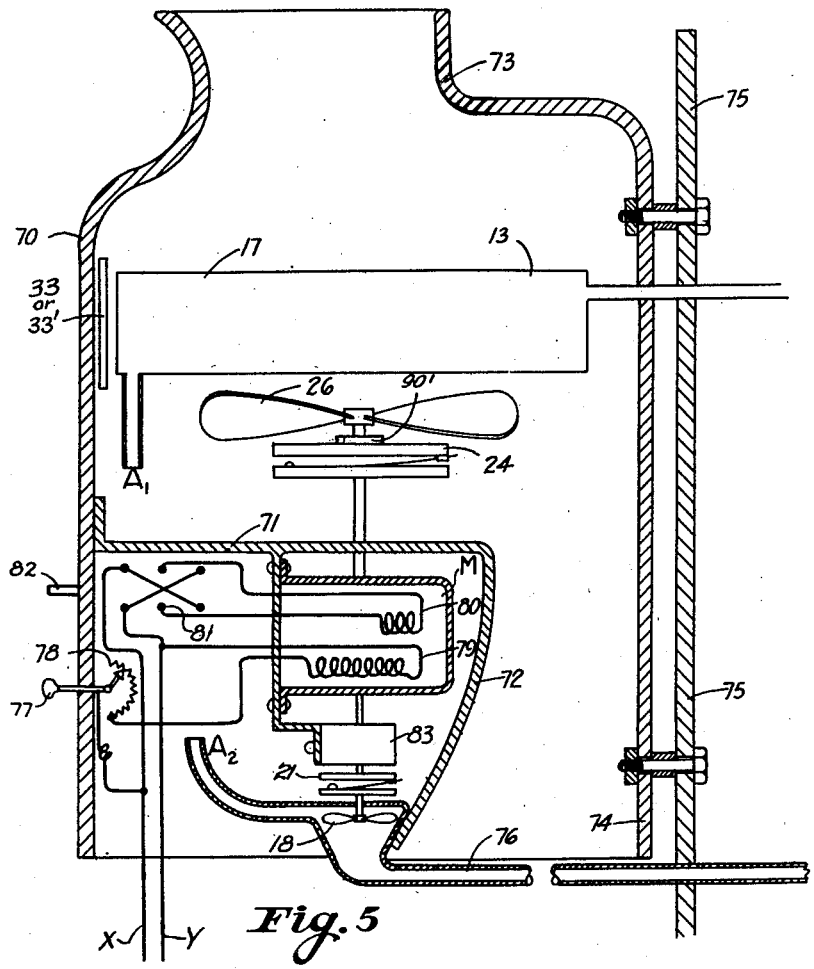
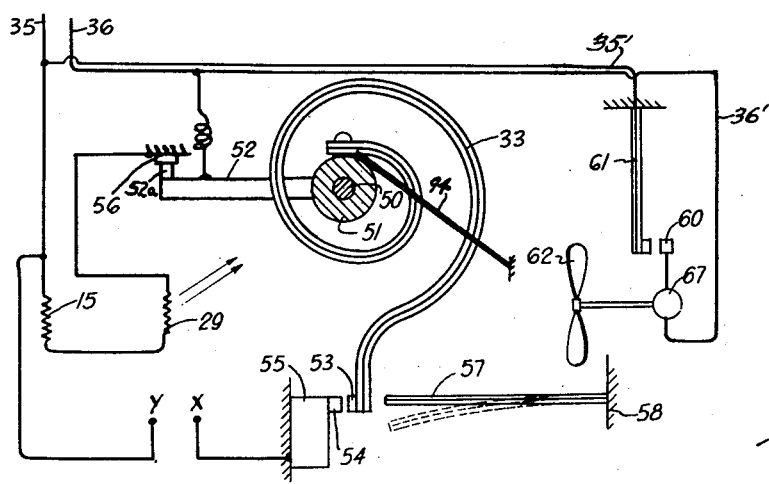
INVENTOR.
William D. Hall April 11, 1950     W. D. HALL     2,503,261
CONTROL SYSTEM FOR HEATERS
Filed March 20, 1947     3 Sheets-Sheet 3
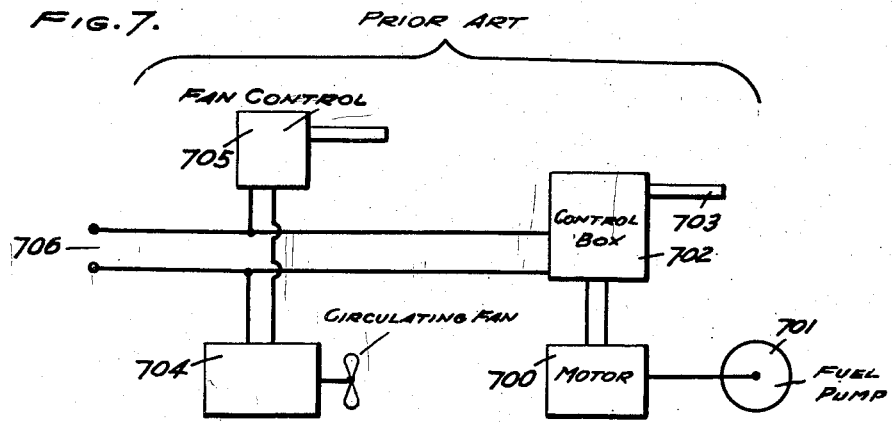
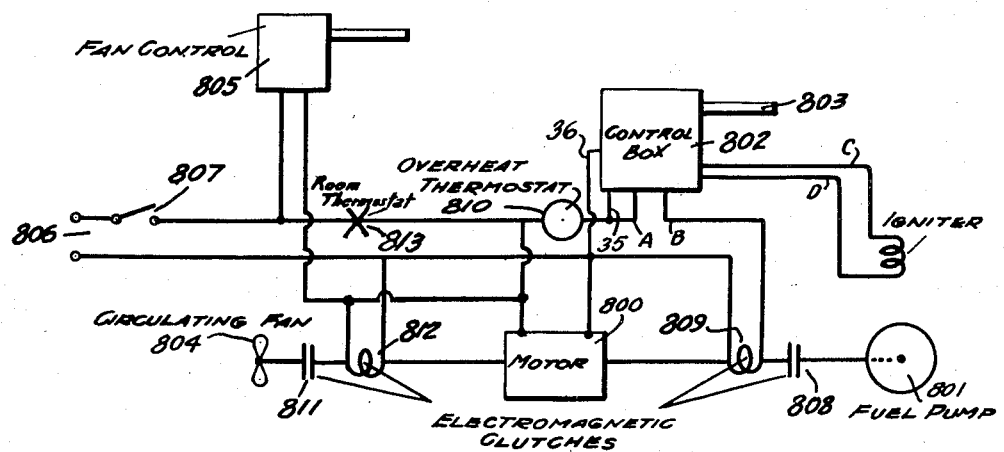
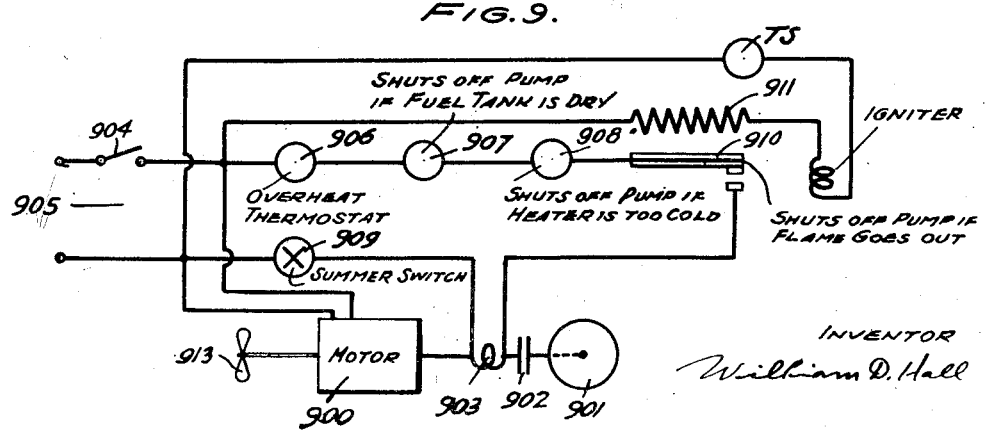
INVENTOR
William D. Hall Patented Apr. 11, 1950

2,503,261

UNITED STATES PATENT OFFICE 2,503,261

CONTROL SYSTEM FOR HEATERS

William D. Hall, Elkins, W. Va.

Application March 20, 1947, Serial No. 735,983

21 Claims. (Cl. 126—110)

This invention relates to heater control systems and more particularly to means for regulating the combustion of, and controlling the rate of heat dissipation from combustible fuel.

An object of the invention is to provide a compact heater. Another object is to use a single motor for both the fuel pump and circulating fan with suitable means for selectively operating the pump and fan as is desirable. Another object is to provide a better method of starting the fan only after the heater becomes hot. Another object is to provide improved thermostatic clutches. Still another object is to provide a system that so operates that the thermostatic control system thereof operates in an improved matter. Numerous other objects and advantages will become apparent hereinafter.

The specific device shown in the drawings and described herein employs a common motor to drive a circulating fan and fuel pump. Thermostatically controlled clutches are interposed between the motor and fan and the motor and fuel pump respectively. These clutches operate to selectively control the fan and pump. The circulating fan and fuel pump are connected together and run at directly proportional speeds. The heat carried away is always directly proportional to the heat generated and therefore the temperature of the output air does not vary as widely as it does in other heaters. The quantity of heat is reduced by reducing the speed of the common motor. A lost-motion type of thermal element is employed to control the motor and effects deenergization of the motor when the temperature of the heater drops sharply. Hence, in response to an accidental extinguishment of the flame the thermal element will deenergize the motor. However, if the motor speed is reduced without an extinguishment of the flame, the thermal element will not deenergize the motor. The reason for this is that I locate the thermal element on a part whose temperature does not vary widely when the motor speed varies. Specific possible locations to effect this result are hereinafter enumerated and may be generically referred to as adjacent to, and responsive to the temperature of, a portion of the radiator that is cooled by the circulating fan. Other outstanding features of the device are described below and in the claims.

In the drawings:

Figure 1 is a schematic diagram of the essential parts of this invention with the certain parts of the fuel flow path and the combustion control parts illustrated in section.

Figure 2 illustrates the thermostatic clutches which may constitute part of this invention.

Figure 3 is a schematic diagram illustrating a modified form of combustion control system that may be used in connection with this invention.

Figure 4 is a schematic diagram illustrating another modified form of combustion control that may be used in connection with this invention.

Figure 5 illustrates, in section, one particular mounting arrangement that may be used with this invention.

Figure 6 illustrates diagrammatically the apparatus used for insuring that the fuel pump is not reversed when the fan is reversed.

Figure 7 illustrates certain prior art control systems whereas Figures 8 and 9 illustrate improved control systems having my invention.

In Figure 1, I have illustrated a gasoline supply tank 10 which may be the carburetor of an automobile or it may be any special tank designed for use with this invention. It is preferably located at about the same height from the ground as the mixer 12 and the combustion chamber 13, but such location is not necessary. Within combustion chamber 13 is a ceramic disc 14 which serves to maintain the fuel ignited once it is ignited. A pipe 16 leads from the chamber 13 to a radiator 17. An exhaust pump 18 is driven by a powerful motor M at such a speed that the vacuum set up in the system draws fuel from tank 10 through the chamber 13 where it is burned. The products of combustion pass through radiator 17 and out pipe 76 to a suitable exhaust. A hot wire igniter 15 is arranged to cooperate with the chamber 13. This igniter may be suitably protected from direct contact with the flame by any well known method. I have not illustrated full details of the parts 10, 11, 12, 13, 14, 15, 16, 17 and 18 for such details are known in a variety of forms to the prior art and specific details of these parts are not part of the present invention. The pump 18 may be a centrifugal pump if high speed operation is desired, or it may be similar to a force pump if low motor speed operation is desired. In any event it is necessary to have a powerful pump at 18 either by a large number of blades, by high speed, or by positive compression, in order to place the entire system under proper vacuum conditions. Since the invention relates to the combination with a pump at 18 of certain other parts, the specific details of the pump are immaterial.

A circulating fan 26 is used to pass air across the radiator 17 and the combustion chamber 13, and this fan is driven by motor M. While it is possible to directly couple the pump 18 and the fan 26 to the motor M, I prefer to couple them through the means of certain thermostatic clutches now to be described, reference being had particularly to Figure 2. The motor M is rigidly mounted to the frame 71 of the heater and has a shaft 43 carrying two round discs 21 and 22. The disc 21 has a rigid ear 44 fastened thereto. The pump 18 has a shaft 43a which extends through the wall of pipe 17 and has relatively airtight bearings 42 and also has collars 41 to prevent endshake and to aid in making the chamber 17 airtight. Shaft 43a carries a disc 19. Supported near the edge of this disc is one end of bimetallic strip 20. When the bimetallic strip 20 is cool it assumes the position shown in Figure 2, namely an engagement with ear 44. Hence when strip 20 is cool the motor M can readily rotate the fan 18. Since bimetallic strip 20 tends to straighten out when heated, it will flex and disengage ear 44 should the heater get too hot. Preferably, strip 20 is located near motor M, as will hereafter appear during the discussion of Figure 5, and will stop the fan-pump 18 in event the heater becomes so hot that the motor M is liable to become overheated. On the other side of the motor M is located the disc 22 which supports the bimetallic strip 23 at one end only of the latter. Strip 23 tends to coil when heated, in other words as seen in Figure 2 the top end of the strip moves to the right when the strip 23 is heated. Strip 23 is not necessarily located near the motor M but is preferably located near the radiator 17. The fan 26 is carried by a shaft 25 which shaft is supported by a bracket 90'. Shaft 25 carries a disc 24 and this disc has a rubber ear 45 fastened thereto. The ear 45 is solely supported at one edge thereof. As the heater 17 becomes warm, the rotating motor will not effect operation of the fan 26 inasmuch as strip 23 is initially out of engagement with ear 45. Soon, however, the strip 23 is heated sufficiently by the radiator 17 that it begins to strike the outer edge of the ear and the repeated impacts on this rubber ear cause the fan 26 to begin to move slowly at first. As the strip 23 becomes hotter its impact against the ear 45 becomes more and more solid until finally the fan 26 runs synchronously with the motor. At this point, assume that for any reason the heating system became dangerously hot. The strip 23 would very firmly press against disc 24 (which will insure rotation of fan 26 even in absence of ear 45) thus making certain that the fan operates at full speed thereby carrying heat away from the system as fast as possible. The fuel pump however can not operate under these conditions since bimetallic strip 20 deflects to such an extent that it moves away from ear 44 and thus disconnects the pump 18 and the motor M.

It is understood that the various shafts 43a, 43 and 25 are arranged solely for rotary motion and are designed for minimum motion lengthwise. The bimetallic strips 20 and 23 are supported by discs 19 and 22 respectively and merely engage or disengage with ears 44 and 45 respectively.

I will now proceed to describe the combustion control system that I have shown in connection with Figure 1. The combustion control system employs but a single bimetallic strip 33' with a contact 33a carried by the upper end thereof. The lower end of bimetallic strip 33' is rigidly supported by a fixture 34 which may be part of the housing 70. The general location of strip 33' with respect to the radiator 17 is shown in Figure 5. It may be stated that strip 33' is placed in any convenient position where there is constant temperature irrespective of variations in the fuel supply. Possible locations are (1) in the path of heated air leaving the exit 70—73 at the top of the heater, (2) closely adjacent the exhaust end of radiator 17 and this is the preferred position, (3) it may be located either on or in the exhaust pipe 76. The control system also has two other parts that are rigidly supported solely at one end. The square rod 32 is rigidly fixed at its outer end to a support 27. It is understood that the three rigidly fixed parts, namely 27, 32 and 34 have a fixed relation with each other. The only movable parts of this combustion control are the free or outer end of strip 33', which moves only when the temperature of strip 33' changes and the movable block 30. Moveable block 30 is rather heavy and has a hole therethrough slightly larger than the rod 32. It also has an insulating section 31 of Steatite. Other than this insulating piece, the block 30 and rod 32 are composed of stainless steel. Block 30 carries a contact point 30a and this point may engage and disengage contact arm 28 depending on the motion of block 30. No springs or other force producing devices, except strip 33', act upon block 30 and therefore this block tends to remain in any position where strip 33' ceases to exert a force on it. Initially, when the heater is in its off position and the system is cool, the strip 33' is curved slightly and the free end is in engagement with insulating block 31. This action maintains contact between 28 and 30a. In addition to being affected by heat from the fuel, strip 33' is affected by heat from resistor 29 which is rather closely associated with strip 33'.

The operation of the combustion control system of Figure 1 is as follows: When a potential is applied across wires 35 and 36 such as by the mere closing of a switch, time clock, or room thermostat (any of which may be connected at 91), current flows through the following path: 35—32—30—30a—28—40—15—39—29—36. Since at this stage of the operation contact 33a is out of contact with block 30, no current flows to the motor M. However, after a short time heat from resistor 29 flexes strip 33 to such an extent that contactor 33a moves into contact with block 30 and this establishes a second current path in addition to the first. This is the position of the parts shown in Figure 1. The second path consists of: 35—32—30—33a—33'—34—38—M—37—26. Since the block 30 is rather heavy it will not begin to move instantly but the strip 33' must be heated considerably more before it has sufficient force to overcome the static friction of this block and move the latter sufficiently to break the circuit at 28—30a. If the fuel satisfactorily ignites, the high heat of the flame will supply ample force to break these contacts and therefore the igniter 15 and resistor 29 are de-energized but of course contact 33a continues to press against block 30 and maintain the motor circuit closed. As the burner continues to heat the strip 33' the latter will continue to move block 30 toward the right due to the pressure exerted on block 30 by the contact 33a. Should the flame then for any reason become extinguished, the strip 33' will begin to cool and reverse its direction of motion. Its contact 33a will leave engagement with block 30 within a short interval of time. I proportion the block 30 as to weight, the strip 33' as to thickness, and the ceramic re-igniter 14 as to mass, so that the re-igniter 14 will remain sufficiently hot to ignite the fuel even after strip 33' has broken its circuit at 33a. Hence, should the flame become extinguished it would not be possible to start the motor unless the re-igniter 14, or the main igniter 15, is sufficiently hot to ignite the fuel. For example, if the re-igniter 14 is massive enough to relight the flame after the latter has been extinguished 30 seconds, I proportion the weight of 30 and the thickness as well as the width of strip 33' so that upon cessation of combustion the circuit at 30—33a is broken in a time substantially less than 30 seconds. Should the fuel fail to burn throughout a period of more than 30 seconds, strip 33 will after perhaps a minute or so engage insulating piece 31. Still further cooling of the heater will take place and strip 33 will push the block 30 to the left due until its contact 30a re-engages contact 28 so that the igniter circuit is reestablished via the circuit 35—32—30—30a—28—27—40—15—39—29—36. The motor M at this time is deenergized, but as heater 29 again raises the temperature of 33, contact at 33a—30 is again made with a consequent restarting of the motor and restablishing flow of fuel which will be relighted by the hot igniter 15.

The above description of operation presumed that the fuel supply was properly ignited by the igniter 15 and that the fuel then continued to burn at least for a short while. I will now describe the operation of my combustion control system under the abnormal condition of failure of the igniter 15 to actually ignite the fuel on the first effort. Assume that the apparatus is in its off position with strip 33 solidly against insulating piece 31. Hence contact is made at 28—30a but broken at 30—33a. Upon closing switch 90, current flows through the resistor 29 as heretofore specifically stated and this causes strip 33 to flex to the position shown in the drawing. The motor M now starts. If the fuel fails to ignite, heater 29 will after an additional time cause strip 33 to flex enough to push block 30 away from contact 28 thus breaking the igniter circuit. This action deenergizes resistor 29 and soon thereafter the strip 33' begins to cool. Such cooling breaks the motor circuit at 33a—30. The strip 33' will continue to cool until it engages 31 and then finally forces block 30 to the left to reclose the igniter circuit at 28—30a. The resistor 29 is again heated and again flexes strip 33' to the right until the motor circuit is again made at 33a—30. If my circuit is carefully studied, in view of the above explanation, it will become apparent that the control system will repeatedly energize and deenergize the igniter 15 and the motor M.

So far as the combustion control systems illustrated herein are concerned, the motor M may be a solenoid valve located in the fuel path as is common in the prior art, provided some means is provided to force the gases through the system.

In addition to other safety precautions mentioned in this disclosure, overheating thermostats such as 92, may be connected in wire 36. Such thermostats may be located near any part of the system that is liable to become overheated. For example, overheating thermostat 92 may be positioned responsive to the temperature adjacent fuel tank 10. A safety switch may be connected at point 93.

For mobile work where the heater is subject to considerable jarring, it is desirable to use a lost-motion switch having rotary motion instead of linear motion. The combustion control system of Figure 3 was designed to employ a thermostat having rotary motion. In this figure, a central rigidly supported shaft 50 is composed of stainless steel. An outer sleeve 51 has a diameter slightly larger than shaft 50 and is arranged to freely slip around the shaft 50. A spring 94 bears downwardly on sleeve 51 and places considerable contact pressure between the sleeve 51 and the shaft 50. Spring 94 does not engage either the arm 52 or bimetal 33 as this spring bears against a portion of sleeve 51 which is in front of the strip 33 and the sleeve-arm 52. Spring 94 may be omitted from the construction if desired with good operation. The strip 33, I have found, should be rather heavy and one specimen device has a strip 33 approximately one-half inch wide, 0.05 inch thick, and of five inches developed length.

The coiled bimetallic element 33 is composed preferably of the highest quality heat withstanding bimetal and has an inner end rigidly bolted or welded to the sleeve 51. The outer end of this bimetal strip carries a contact point 53. A stationary contact point 54 supported by the rigid block 55 cooperates with contact 53. The sleeve 51 carries an arm 52 which arm is relatively light as compared to the total weight of the sleeve 51. This relationship may be effected by making the sleeve much longer in the direction parallel to the shaft than the arm 52 in such direction. The reason for this relationship is to prevent the arm 52 from unbalancing the system. The arm 52 carries a contact point 52a. The stationary contact point 56 is arranged to cooperate with movable contact 52a. Another bimetallic strip 57 may be employed, although this strip can satisfactorily be composed of an ordinary rigid metal as under normal conditions the operation of the system does not depend upon flexure of this strip. The strip 57 is constructed of a thick piece of bimetal and deflects to the dotted line position at a temperature of about —50° F. At normal temperatures it is straight or at least curved downward only slightly. The reason for flexure of this strip 57 is that should the temperature go to say —50° F. during a cold winter month and at a time when the heating system is not in operation, the bimetallic strip 33 will not be overstressed but the strip 57 will move from the path of strip 33 and the free end 53 thereof can rotate counterclockwise without striking any obstruction. If a strip 57 of rigid ordinary metal should be used, it is possible for the ambient temperature to fall so low that strip 33 will strike strip 57 and upon further fall in temperature internally stress itself to such a large extent as to take on permanent deformation.

Since it is necessary for the ambient temperature to fall approximately 150° F. after the end of 53 strikes 57 before the strip 33 would become permanently stressed in event strip 57 was of rigid metal, the outer end of strip 33 will touch 57 at room temperatures and exert a slight tension against 57. This small tension will not permanently deform the resilient bimetallic strip 33. Contacts 52a, 56 are therefore closed at ordinary room temperatures, but contacts 53—54 open. The wire 36 is a flexible lead and fastens to arm 52; however, the wire 36 does not have any spring action or in any way mechanically exert a force directly upon arm 52; it merely connects electrically thereto.

In Figure 3, the wires X and Y connect respectively to the wires X and Y of Figure 5 and hence to the motor M and its controller of Figure 5.

Upon applying potential to wires 35—36 while the apparatus is in the initial off position, only one current path exists, namely: 35—15—29—56—52a—36. Heat from resistor 29 affects strip 33 and causes the same to tend to coil up. This will not break the circuit at 52a—56 at this time inasmuch as the friction between 50 and 51 is appreciable and will tend to hold the position shown until a definite force is exerted on the sleeve 51 by the bimetal strip 33. The contact 53 moves through midair until it strikes contact point 54. During this time the strip 33 cannot exert a torque on the sleeve 51. Finally as resistor 29 gets strip 33 hotter and hotter, contact 53 moves into engagement with stationary contact 54 and this engagement closes the motor circuit via the following path: 35—via wire Y to motor M and by wire X to 55—54—53—33—51—52—36. For an interval of time after this, both the motor M and the igniter 15 operate simultaneously. The time during which the two operate simultaneously is governed by the tension in spring 94. If this spring causes considerable friction between sleeve 51 and shaft 50, the igniter and motor will be on simultaneously a long time. Another method of obtaining a long simultaneous operation of these parts is to have resistor 29 just powerful enough to barely heat strip 33 to the point where the circuit between 52a and 56 is broken.

As just stated, the igniter 15 and motor M operate simultaneously for a while. If the fuel ignites, heat will be supplied to strip 33 from the combustion chamber and this strip will continue to flex. Since contact 53 has now struck a rigid obstruction 54, further flexure of the strip will result in rotation of the sleeve 51 against the friction of stationary shaft 50. Consequently, arm 52 will be rotated counter-clockwise and contact between 52a and 56 broken. This deenergizes the igniter 15 and resistor 29. Further heating will continue to rotate arm 52 counter-clockwise and contacts 53 and 54 will remain in engagement. If the heater 17 becomes rather hot and then the flow of fuel temporarily ceases, the friction between 50 and 51 will be sufficient to hold arm 52 in the position it had when the flame stopped. Cooling of 33 will therefore result first in a counter-clockwise rotation of contact 53 and a quick disengagement of 53 and 54. However, such rotation is limited as the free end of strip 33 strikes 57 after rotating counter-clockwise a fraction of an inch. As soon as strip 33 strikes 57 the subsequent flexure of strip 33 will result in a clockwise rotation of arm 52 with slippage taking place at 50, 51. Strip 57 will finally return to a straight position from its high temperature condition and as strip 33 approaches room temperature it contacts 52a—56 will be reclosed. This closure will reclose the igniter circuit 15, reenergize resistor 29, reheat 33 which strip will begin to rotate 53 clockwise without any slippage taking place at 50, 51, reclose 53—54, restart the motor, and subsequently reopen the circuit to the igniter at 52a—56. Hence an attempt at reignition will be made. Should this attempt fail to relight the fuel, additional attempts will automatically be made.

When the heating system reaches a predetermined temperature, the bimetallic switch arm 61 closes to 60 starting an added fan motor 67 that is also energized from wires 35' and 36'. This fan motor 67 has a fan 62 and is totally independent of motor M and may replace the fan blade 26 if desired or it may be used together with fan 26. However, the two are normally not necessary. The cooling effects of fan 62 are such as to hold the system at a predetermined maximum temperature. After running a short while, fan 62 will cool the system until 61 opens. Then the fan stops and the system temperature rises until 61 again closes. This tends to hold the interior of casing 70 at a predetermined maximum temperature and as a result, upon cooling of the system due to extinguishment of the flame, it will not require an unduly long period for 52a and 56 to reengage. The time required for them to reclose is greatly reduced by use of fan 62, or by use of fan 26. The parts 60, 61, 62 and 67 may be omitted if desired, especially if fan 26 is used.

The control system of Figure 4 will now be described in detail. The system of Figure 4 is shown in section. The shaft 50 is rigidly fixed at its rear end. The sleeve 51 is arranged to slip over the shaft 50 as the sleeve has a larger inside diameter than the diameter of the shaft. A spring 94 is located in front of bimetallic strip 33. The spring presses firmly on sleeve 51 (which obviously extends well in front of strip 33 as sleeve 51 is sectioned whereas the strip 33 is in full view). The arm 52 is fastened electrically and mechanically to sleeve 51 and extends behind bimetallic strip 33 and carries a contact 52a. The bimetallic strip is arranged to coil up when heated and to uncoil when cooled. A stationary support 67 supports screw 68 of the latter carrying on its tip end a contact 69. Another stationary contact, not electrically connected, is provided at 56. A stationary square bar 66 supports a large movable block 65. A contact point 64 is fastened to the block 65, moreover a piece of electrical insulation extends across block 65 at 65a. An electrical hot wire igniter 15 has a resistor 29 in series with it. Resistor 29 is arranged to heat strip 33 when energized.

In the off position, arm 52 is initially against 69 and strip 33 has its lower end against 65a. Hence contacts 63 and 64 are disengaged. When power is applied at 35, 36, current flows as follows: 35—15—29—67—69—52a—52—36. Hence resistor 29 becomes heated and causes strip 33 to coil up until contact 63 engages 64. This causes motor M to be energized via the following circuit: 36—52—33—63—64—65—66—M—91—93—94—35. For an interval the motor M and igniter 15 will simultaneously operate thus igniting the fuel. Further heating of 33 due to heat from the flame (or 29) will result in further coiling of 33. Since block 65 is very heavy, slippage will take place at 50—51 before 65 will slip. Hence, contacts 69—52a will be broken and arm 52 will move into engagement with 56. Since 56 is stationary, the slippage will now take place at 65—66 and as the burner continues to heat, the block 65 will slip along 66 with 63 and 64 maintaining contact. An arm 90 is pivoted near its center at 92. It carries on its lower end a contact point 93. A complementary stationary contact point 94 connects to wire 35. A spring 91 tends to produce clockwise motion of the arm and thereby normally maintain the contacts 93 and 94 together. When overheating takes place block 65 moves to the left, engages arm 90, rotates the latter, and breaks the motor circuit at 93, 94. If spring 91 is omitted the system cannot be restarted without manually resetting arm 90. With spring 91 in operation the system will restart automatically when strip 33 cools.

Should the burner satisfactorily ignite and burn for a long while, then the flame be accidentally extinguished, 63 will immediately drop away from 64 and rotate counter-clockwise until it comes into contact with 65a. Strip 33 will tend to further uncoil and reclose 52a—69 thus reenergizing the igniter circuit 15. Heater 29 will reheat 33 thus reclosing 63 and 64, restarting the motor M. Should the flame fail to relight, the heat from 29 will tend to further coil up 33 so as to break the circuit at 52a—69. This will cause 33 to cool and move into engagement with 65a. Further cooling of 33 will take place thus reclosing 52a—69 and this will reheat 29 and 33 thereby making another attempt at ignition. As a result, repeated ignition attempts are made. The same holds true in event an original attempt at ignition fails; that is, several attempts to ignite will be made if the first effort fails. Should it be deemed desirable, suitable safety switches such as overheating thermostats, time clocks, or switches, may be placed in line 36.

The motor M is preferably a shunt wound direct current motor having a field winding 79 and an armature winding 80. A rheostat 78 includes a control knob 77 by means of which the motor field current, hence the motor speed, may be varied. When a large heat output from the heater is desired the knob 77 is adjusted for maximum resistance at 78. This causes the motor M to drive the pumps 18 and 26 at high speed and thereby propel a large quantity of fuel into the combustion chamber as well as propel a large quantity of circulating air over the radiator 17 and combustion chamber 13. If low heat output is desired, the knob 77 may be adjusted for minimum resistance at 78 thereby effecting a slow speed of operation for motor M. Under this condition only a small quantity of fuel is drawn into the combustion chamber and a small quantity of circulating air is passed through the heater. Since the quantity of circulating air is approximately proportional to the quantity of fuel it follows that the temperatures of the circulating air, of the combustion chamber 13, of the radiator 17, and of the strip 33 do not radically vary when the rheostat 78 is adjusted from high heat output to low heat output and vice versa.

In the prior art, it is common to operate the circulating fan at a constant speed and vary the supply of fuel independently therefrom. When the fuel feed is low the circulating air in prior art devices is rather cool and when the fuel feed is high the circulating air is hot. In other words, the temperature of the circulating air, and of the remainder of the system, varies proportionally with the quantity of fuel.

The fact that the temperature of my system does not vary greatly with the heat output is of great advantage in insuring quick consistent operation of the control system. It also means that the output air never becomes uncomfortably or dangerously hot no matter how great the output becomes.

It is desirable, although not necessary, to be able to reverse the direction of fan 26 so as to propel the heated air selectively either from the upper outlet 73 of the heater or from the lower outlet 72, 74. When the heated air travels downwardly it is deflected from the motor chamber by partitions 71 and 72 before it passes out the opening 72, 74.

A reversing knob 82 may be used. This operates a reversing gear mechanism as well as a reversing switch 81. The armature coil 80 is connected across the blade arms of the switch 81, whereas the pole arms are cross connected as is common in reversing switches. Upon manually operating knob 82 the current through the armature 80 is reversed. This reverses the direction of rotation of the motor M and of the fan 26. However, due to the parts in gear box 83 (see Figure 5), the pump 18 is not reversed. The elements of Figure 6 comprise the gear box 83. The knob 82 operates the reversing switch 81 and is also coupled to a shaft 200. This shaft is supported for rotary motion by suitable bearings. It is also arranged for lateral motion. The motor shaft 43 has a gear 204 arranged to engage either gear 201 or 202 depending on the position of knob 82. A third gear 203 is driven by shaft 200 and the latter drives gear 205, and in turn shaft 43a and pump 18. Since reversing mechanisms similar to that shown are common in the prior art I will not explain the specific details thereof. It is sufficient to say that upon operating the knob 82 the current in the armature 80 is reversed and also the coupling between 43 and 43a is reversed so that the pump 18 always operates in one direction. The fan 26 being reversed causes the air flow to be reversed. Hence the heated circulating air may be propelled out either the top or the bottom of the heater.

Preferably the device is started by operating the motor M at full speed and then reducing the speed to that desired.

In order to simplify Figure 5, the radiator pipe 17 is shown broken at A1 and A2. In the actual device the pipe at A1 extends continuously to that at A2 and connects therewith as shown in Figure 1.

In Figure 7, a motor 700 drives fuel pump 701 and is controlled by control box 702, the latter having a combustion-responsive thermostat 703. A fan 704 circulates air over the heater chamber and into the room to be heated. The fan is controlled by a thermostatic fan control 705. Electricity is fed in at 706. There are a wide variety of control boxes that are used at 702 in Figure 7. Figure 8 illustrates an improved system using these prior art control boxes. Wherever a prior art control box, such as 702, is connected to a motor, such as 700, this same control box may be used in the system of Figure 8 by connecting the same to the coil 809 of electro-magnetic clutch 808. For example, in Figure 8, a control box 802 has a thermal control means 803. The control box 802 may be of any desired type for example the control box 1 of the Ira E. McCabe Patent No. 1,654,051; the control system of Patent No. 2,196,442 to Meade J. Maynard; or the control system of Patent No. 1,883,242 to John C. Bogle.

To illustrate how the control box of Figure 9 of McCabe Patent 1,674,051 may be inserted in box 802 it is mentioned that the wires C and D of Figure 8 correspond to the wires that leave McCabe's terminals 15 and 20. Wires A and 35 of my Figure 8 correspond to McCabe's input wire to his terminal 16, and my wire B corresponds to that wire of McCabe connecting his coil 21 to his motor M. To illustrate how the control system of Maynard 2,196,443 may be substituted for box 802 it is mentioned that wires 76 and 77 of Maynard correspond to wires C and D of Figure 8, wire 96 of Maynard corresponds to my wire 36 of Figure 8, wire 100 of Maynard corresponds to the lower side of my source 806, and Maynard's wire 99 corresponds to wire B of my Figure 8. Maynard's switch 23 corresponds to my switch 813 and Maynard's wires 85 and 91 would connect where my wires 35 and 36 connect. To illustrate how Bogle 1,883,242 would be inserted in box 802 it is mentioned that wires C and D of said Figure 8 would be wires 61 and 62 of Bogle. Wires 48 and 49 of Bogle would be wires 806 of my Figure 8. The wire 56 of Bogle corresponds to my wire B of Figure 8, and wire 48 of Bogle corresponds to my wire A. Since Bogle includes a room thermostat 36 and a pressurestat 37, the parts 810 and 813 of my Figure 8 may be omitted, or in the alternative Bogle's parts 36 and 37 may be shorted and omitted.

Furthermore any of the control systems shown in this application may be used at 802 the only change being that the coil 809 is connected where motor M is now connected. For example, the control system of Figure 4 could be used exactly as shown except that coil 809 of Figure 8 would replace motor M of Figure 4. That is, wires A and B of Figure 4, instead of being connected to motor M, correspond to wires A and B of Figure 8, and connect to the coil 809. The wires C and D of Figure 4, correspond to wires C and D of Figure 8, and wires 35 and 36 of Figure 4 correspond to wires 35 and 36 of Figure 8. Hence, should the heating system of Figure 8 rise in temperature at which point the flame goes out, the sudden drop in temperature would disconnect pump 801 at clutch 808. In event of overheating, the overheating thermostat 810 located just above the combustion chamber in the warm air supply will cut off the current to clutch coil 809 shutting down the fuel pump 801. The fan 804 is stopped when cold, but when fan control 805 gets warm it passes current through coil 812 to cause clutch 811 to connect fan 804 to motor 800. Electricity is supplied at 806 and a starting switch or room thermostat 807 may be used.

Preferably, however, switch 807 is merely a starting switch and the room thermostat is located at 813.

In Figure 9, electricity is fed in wires 905, through switch or room thermostat 904, and through overheat thermostat 906. The latter is a thermostat near the combustion chamber which opens its circuit when the heater overheats. Switch 907 is a float in the fuel tank which opens its circuit when the fuel tank runs dry. Switch 908 is a thermostat which opens its circuit if the heater gets so cold that the igniter cannot ignite the fuel. Heater 911 is in series with the igniter and switch TS which may be a time switch or a thermal switch which opens when the heater gets hot to turn off the igniter. Heater 911 heats bimetallic strip 910 to start the burner but if the flame goes out 910 cools and opens the circuit to coil 903. Bimetallic strip 910 is responsive to heat from the combustion chamber to control the system after the igniter is deenergized.

It is understood that it is within the broader aspects of this invention for fans 804 and 913 to be the water circulator of a hot water heating system.

One feature of my invention is that the bimetallic strip 33' is located at a position where the temperature does not widely vary, and therefore the operating conditions of the strip do not widely vary when the heat output is reduced. One advantage of this is it gives a much improved over-all design and another advantage is that when the heat output is reduced the strip 33' is not cooled so much as to cut off the fuel flow.

This application is a continuation in part of my copending application Serial No. 347,951, filed July 27, 1940, entitled Control system, and now abandoned. Figures 1 to 6 inclusive hereof and the descriptions thereof, are found in substance in said copending application.

I claim to have invented:

1. In a heating system, a burner, a fuel pump for feeding fuel to said burner, a heat exchange chamber receiving the products of combustion of said burner, a circulating fan for driving air across said chamber, a motor for driving both said pump and fan synchronously, means for varying the speed of the motor, first and second thermostatically operated clutches adjacent the downstream side of said chamber and respectively connected between the motor and fuel pump and the motor and fan, the first of said thermostatically operated clutches being responsive to the temperature of the circulating air that has passed across said chamber and including means for disconnecting the fuel pump from the motor when the temperature of said air rises above a predetermined level, the second of said thermostatically operated clutches being responsive to the temperature of the circulating air that has passed across said chamber and including means for connecting the circulating fan to the motor when the temperature of such air is above a predetermined level and disconnecting them when such temperature is below such level, an electric igniter for the burner, a thermal switch adjacent said chamber for controlling said igniter as well as said motor, and supporting means for said thermal switch to position the same responsive to the temperature of the exhaust of said heat exchange chamber.

2. In a heating system, a heater, a fan for dissipating heat from said heater, a motor, a thermostatic coupling means for automatically operatively coupling the fan to said motor when the heater is heated and uncoupling the fan from said motor when the heater is cooling, and a pump driven by said motor for effecting fuel flow to said heater, said thermostatic coupling means including an electromagnetic clutch interposed between the fan and said motor and also including a thermal member responsive to heat from the heater for controlling said clutch.

3. In a heating system, a chamber where fuel is burned, a fuel feed line to said chamber, a movable means including a pump to effect feed of fuel through said fuel feed line to said chamber and also including air flow producing means mechanically connected to said pump for producing a stream of air which carries away the heat generated in said chamber, and means responsive to the temperature of the stream of air immediate of the heating chamber for stopping combustion in said chamber by reducing the feed of fuel thereto, without reducing the speed of the air flow, in response to predetermined changing thermal conditions.

4. In a fuel burning heating system, a combustion chamber, a source of fuel supply, a pump for effecting flow of fuel from said source into said combustion chamber to constitute the main fuel supply for the combustion chamber, heat dissipating means cooperating with said combustion chamber, said heat dissipating means including a circulating fan, a single motor for driving both said pump and said fan, and thermal means responsive to temperature conditions of said chamber for mechanically disconnecting said pump and said motor in response to rise in temperature of the chamber to a predetermined level.

5. The device defined by claim 3 in which said movable means includes an electric motor for driving said pump, and in which the means responsive to the temperature of the stream of air immediate of the heating chamber for stopping combustion in said chamber includes a thermostatically operated clutch connecting said motor and pump together when the temperature of said stream of air is below a predetermined value and disconnecting the motor and pump in response to a rise in temperature of said stream to a predetermined temperature.

6. In a control system for a heater the combination with said heater of a fuel pump, a circulating pump for dissipating heat from the heater, a common motor for driving said pumps, separate clutches interposed between the motor and pumps respectively, and first and second thermally controlled elements for operating said clutches respectively, the first element including means operable to control the clutch between the motor and fuel pump in response to predetermined changing thermal conditions of the heater and the second element including means operable to control the clutch between the motor and the circulating pump to maintain the motor and circulating pump connected when the heater is hot and to maintain the motor and circulating pump disconnected when the heater is cool.

7. The device defined by claim 6 in which said first element includes means for maintaining the motor and fuel pump connected when the temperature of a portion of the heater is below a predetermined temperature and maintaining the same disconnected when the temperature of said portion is above said level.

8. The device defined by claim 6 in which said first element includes means for maintaining the motor and fuel pump connected when the temperature of the heater is rising and for disconnecting the same when the temperature of said heater is falling.

9. The device defined in claim 8 in which said first element also includes means for operating the clutch between the motor and fuel pump to maintain the same disconnected when the temperature of a portion of the heater is above a predetermined level irrespective of the direction of temperature change.

10. In a heater with combustion control, a combustion chamber, a radiator which communicates with said combustion chamber to receive the exhaust gases therefrom, a circulating fan for passing a stream of air over the radiator, a pump for effecting supply of fuel to said combustion chamber, a common electric motor for propelling both said pump and said fan, means connected to said motor, pump and fan to couple the three together and effect operation of all three at proportional speeds, an electric motor circuit for supplying current to the motor, and a thermostatic combustion switch having the thermal sensitive element thereof located adjacent to and responsive to the temperature of a portion of the radiator that is subject to the cooling effects of said stream, said switch being connected in said motor circuit and including means operable to permit fuel flow when the temperature of said element is rising irrespective of the actual temperature level and to prevent such flow when the temperature of said element is falling irrespective of the actual temperature level.

11. The device defined by claim 3 in which said movable means includes an electric motor for driving said pump, and in which the means responsive to the temperature of the stream of air immediate of the heating chamber for stopping combustion in said chamber includes a thermostatically operated clutch maintaining said motor and pump together when the temperature of said stream of air rises and disconnecting the motor and pump when the temperature of said stream of air falls.

12. The device defined by claim 3 in which said movable means includes a motor for driving said pump, and in which the means responsive to the temperature of the stream of air immediate of the heating chamber for stopping combustion in said chamber includes a thermostatically operated clutch connecting said motor and pump together.

13. The combination with a fuel burning heater of a main fuel pump for feeding fuel to said heater, a motor for driving said pump, a clutch interposed between the pump and the motor, a fan connected to and driven by said motor independently of said clutch for dissipating heat from said heater, and means controlling said clutch comprising thermal means responsive to the temperature of the heater for effecting disengagement of the clutch when the temperature of the heater rises above a predetermined level.

14. The combination with a fuel burning heater of a main fuel pump for feeding fuel to said heater, a motor driving said pump, a clutch interposed between the motor and pump for engaging and disengaging the two, and means for controlling the engagement of the clutch to initially effect engagement of the clutch during the starting period of the heater and thereafter to control the clutch according to the temperature of the heater, said last named means including thermal means responsive to the temperature of the heater for maintaining engagement of the clutch when the heater is heating and disengagement when the heater cools.

15. The combination with a main fuel burning heater of a main fuel pump therefor, a motor, a clutch connecting the motor with the pump for engaging and disengaging the two, a fan connected to and driven by said motor independently of said clutch, and means controlling said clutch including means to effect engagement thereof during the starting period of the heater, the first-named means including means to control the clutch during normal operation of the heater, said last named means including thermal means responsive to the temperature of the heater for maintaining engagement of the clutch when the heater is hot and disengagement of the clutch when the heater cools.

16. The combination of claim 15 in which the means controlling said clutch comprises the following: a thermal element which when hot effects engagement of the clutch and which when cool effects disengagement of the clutch, a resistor adjacent the element for heating the same, means for starting the heater comprising a circuit for energizing the resistor, and means for de-energizing the resistor after the heater has become started.

17. A heater with combustion control as defined in claim 10 having in addition control means for varying the speed of said motor.

18. A heater with combustion control as defined in claim 10 having in addition control means in the motor circuit for widely varying the speed of the motor to thereby vary the heat output, said thermostatic combustion switch being sufficiently sensitive to decreasing temperature that in the absence of said circulating fan the said switch will prevent fuel flow under the circumstance when the control means is operated to substantially reduce the heat output, said circulating fan being an air circulating fan having sufficient air circulating capacity that it will under such circumstance maintain the temperature level of said switch sufficiently constant as to avoid the switch preventing fuel flow.

19. A heater with combustion control as defined in claim 10 in which said circulating fan is an air circulating fan of such size that the air it circulates over the radiator will vary the heat dissipation from the radiator to such an extent as to maintain the actual temperature level of the radiator substantially constant, and thereby prevent said switch from stopping fuel flow, when the motor speed is substantially reduced.

20. A heater with combustion control as defined in claim 10 in which said pump is an exhaust pump connected to set up a vacuum in the radiator, and in which said thermal element is outside of the radiator and closely adjacent the exhaust end thereof.

21. The combination defined in claim 13 in which the means controlling said clutch includes an electromagnet controlling the engagement of said clutch and also includes a thermal switch subject to temperature of the heater for controlling the electromagnet.

WILLIAM D. HALL.

REFERENCES CITED

The following references are of record in the file of this patent:

UNITED STATES PATENTS

| Number | Name | Date |
|---|---|---|
| 897,732 | Gerdes | Sept. 1, 1908 |
| 1,333,229 | Toles | Mar. 9, 1920 |
| 1,406,111 | Tuck | Feb. 7, 1922 |
| 1,583,238 | Scudder | May 4, 1926 |
| 1,849,713 | Grant | Mar. 15, 1932 |
| 1,863,443 | Goodridge | June 14, 1932 |
| 1,893,875 | Aldridge | Jan. 10, 1933 |
| 1,969,968 | Dever | Aug. 14, 1934 |
| 2,037,857 | Fox | Apr. 21, 1936 |
| 2,062,605 | Peters | Dec. 1, 1936 |
| 2,087,393 | Wilson | July 20, 1937 |
| 2,141,873 | Modine | Dec. 27, 1938 |
| 2,158,250 | Peters | May 16, 1939 |
| 2,159,658 | Hall | May 23, 1939 |
| 2,172,667 | Nelson | Sept. 12, 1939 |
| 2,174,275 | Raney | Sept. 26, 1939 |
| 2,175,812 | Meyerhoefer | Oct. 10, 1939 |
| 2,191,173 | McCollum | Feb. 20, 1940 |
| 2,207,776 | Black | July 16, 1940 |
| 2,210,976 | Hallinan | Aug. 13, 1940 |
| 2,216,109 | Castagna | Oct. 1, 1940 |
| 2,243,609 | Spackman | May 27, 1941 |
| 2,254,801 | George | Sept. 2, 1941 |
| 2,263,098 | Mueller | Nov. 18, 1941 |
| 2,286,853 | Holthouse | June 16, 1942 |
| 2,302,456 | McCollum | Nov. 17, 1942 |

FOREIGN PATENTS

| Number | Country | Date |
|---|---|---|
| 331,874 | Great Britain | July 9, 1930 |